(12) United States Patent
Hruska

(10) Patent No.: US 6,431,480 B1
(45) Date of Patent: Aug. 13, 2002

(54) SQUARE BALE PROCESSOR

(75) Inventor: Kevin Hruska, Gerald (CA)

(73) Assignee: Bridgeview Mfg. Inc. (CA)

( * ) Notice: Subject to any disclaimer, the term of this patent is extended or adjusted under 35 U.S.C. 154(b) by 13 days.

(21) Appl. No.: 09/715,822

(22) Filed: Nov. 17, 2000

(30) Foreign Application Priority Data

Nov. 30, 1999 (CA) .............................................. 2291319

(51) Int. Cl.$^7$ .............................................. B02C 19/12
(52) U.S. Cl. .................................. 241/101.76; 241/605
(58) Field of Search ................................ 241/605, 294, 241/194, 101.763, 101.76

(56) References Cited

U.S. PATENT DOCUMENTS

| | | |
|---|---|---|
| 4,088,272 A | 5/1978 | Grillot |
| 4,449,672 A | 5/1984 | Morlock et al. |
| 4,657,191 A | 4/1987 | Dwyer et al. |
| 4,923,128 A | 5/1990 | Ostrowski |
| 5,209,413 A * | 5/1993 | Dwyer et al. ........... 241/101.76 |
| 5,340,040 A | 8/1994 | Bussiere et al. |
| 5,556,041 A | 9/1996 | Cheesman et al. |
| 5,601,241 A | 2/1997 | Brewster |
| 5,653,394 A | 8/1997 | Bussiere et al. |
| 5,738,287 A | 4/1998 | Vanderberg |
| 5,813,616 A | 9/1998 | Vandervalk |
| 5,895,001 A | 4/1999 | Kuelker et al. |
| 6,027,054 A | 2/2000 | Kaye et al. |

FOREIGN PATENT DOCUMENTS

| | | |
|---|---|---|
| CA | 2160646 | 4/1997 |
| CA | 2191692 | 10/1998 |

OTHER PUBLICATIONS

Misener, G.C., et al., A stationary large round bale shredder, Canadian Agricultural Engineering, 1990, pp. 127–129.

* cited by examiner

Primary Examiner—Mark Rosenbaum
(74) Attorney, Agent, or Firm—Killworth, Gottman, Hagan & Schaeff, L.L.P.

(57) ABSTRACT

A square bale processor having an elongated conveyor mounted on the frame and a mechanism for mounting the frame to a set of wheels in such a way that the back end of the conveyor may be positioned a predetermined distance above the ground or adjacent to the ground. A bale shredding roller which may be substantially cylindrical or may be in the shape of a truncated cone with flails symmetrically spaced about its circumference and along its length is rotatably mounted adjacent the front end of the conveyor. The axis of rotation of the shredding roller is positioned in a plane which is substantially perpendicular to the conveyor in the direction of the length of the processor. The roller axis at the back end of the roller is positioned below the front end of the conveyor. The bale shredding roller axis may be substantially horizontal or it may slope upward from the back end of the shredding roller to the front end of the roller. Further one or more feed rollers may be mounted transversely to the frame above the shredding roller for assisting to drive a bale onto the shredding roller. The roller may include auger fins or beater bars to grip into a bale.

21 Claims, 10 Drawing Sheets

SQUARE BALE PROCESSOR

FIELD OF THE INVENTION

The invention relates generally to bale processors, and more particularly to square bale processors.

BACKGROUND OF THE INVENTION

Crop materials, such as straw, hay or other forage are often baled in order to protect the material and make it easy to move and store at an appropriate location. When the material is to be used for feed or bedding, the bales must be transported to the location where they are required, broken apart and distributed in some desirable manner.

Over the years, a number of bale processors have been developed which are capable of loading and processing round bales. U.S. patent application Ser. No. 302,280 filed on Apr. 30, 1999 and issued as U.S. Pat. No. 6,199,781 on Mar. 13, 2001; U.S. patent application Ser. No. 303,263 filed on Apr. 30, 1999 and issued as U.S. Pat. No. 6,109,553 on Aug. 29, 2000; and U.S. patent application Ser. No. 312,570 filed on Apr. 30, 1999 and issued as U.S. Pat. No. 6,202,950 on Mar. 20, 2001, which are incorporated herein by reference, describe a variety of such bale processors. These bale processors disintegrate bales and discharge the material either as bedding across an area, or as feed in the form of a windrow or into a feed bunk.

These and other similar bale processors are particularly adapted to process round bales and are capable of carrying one large bale to the location where the material is required. In order to process more then one bale, it is necessary for the bale processor to return to where the bales are stored or to have a second machine with a front end loader bring the bales to the processor.

A bale processor designed to carry more than one round bale at a time is described in U.S. Pat. No. 4,657,191 which issued to Dwyer et al on Apr. 14, 1987. This particular bale processor includes an elongated conveyor pivotally mounted about its wheel axle such that the back end will pivot towards the ground enabling the conveyor to move a number of bales onto itself However, in this particular arrangement the shredding rollers are at one side of the processor and a further assembly is required to move the front bale laterally into the shredding rollers. The result is a cumbersome arrangement which is not particularly effective for the loading and processing square bails or for discharging the bale material as desired.

Therefore, there is a need for a processor which is capable of self loading, carrying a number of bales to where the bale material is needed and processing the bales effectively, particularly when the bales are of the large square variety.

SUMMARY OF THE INVENTION

The invention is directed to a bale processor comprising a frame having front and back ends, an elongated conveyor mounted on the frame and a mechanism for mounting the frame to a set of wheels. The wheel mechanism also functions to move the back end of the conveyor between positions a predetermined distance above the ground and adjacent to the ground. The bale processor further includes a bale shredding roller which has a front end and a back end and which is rotatably mounted adjacent the front end of the conveyor. The axis of rotation of the shredding roller is positioned in a plane which is substantially perpendicular to the conveyor in the direction of the length of the processor; the roller axis at the back end of the roller is positioned below the front end of the conveyor. The processor further includes a conveyor control to operate the conveyor in either direction.

In accordance with another aspect of this invention, the conveyor includes two or more chain conveyors mounted substantially parallel to one another along the length of the processor. All of the chain conveyors may be of equal length or some of the chain conveyors may be substantially shorter than others.

With regard to another aspect of the invention, one or more feed rollers may be mounted transversely to the frame above the shredding roller for assisting to drive a bale onto the shredding roller. The roller may include auger fins or beater bars to grip into a bale.

In accordance with yet another aspect of the invention the bale shredding roller may be substantially cylindrical or it may be in the shape of a truncated cone with flails symmetrically spaced about its circumference and along its length. The bale shredding roller axis may be substantially horizontal or it may slope upward from the back end of the shredding roller to the front end of the roller. Specifically, the bale shredding roller may comprise an axle, a cylindrical drum fixed to the axis, a plurality of circular plates spaced along the axle; and a number of flails rotatably mounted symmetrically between the plates along the length of the axle. The diameter of the circular plates may be substantially equal or the diameter of adjacent circular plates may be sequentially smaller from the front end towards the back end of the shredding roller. In addition, the bale shredding roller may further include a number of curvilinear fins fixed to the hub between the smallest circular plate and the back end of the shredding roller.

In accordance with a further aspect of this invention, the mechanism for mounting the frame on wheels which are rotatably fixed to an axle may comprise at least two support members spatially positioned between the frame and the wheel axle with one end of each support member being fixed to the axle and the other end of each support member being pivotally attached to the frame whereby the wheels may be pivoted about the frame attachment for lowering and raising the back end of the conveyor. The pivoting movement between the frame and the wheels may be controlled by hydraulic cylinders.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
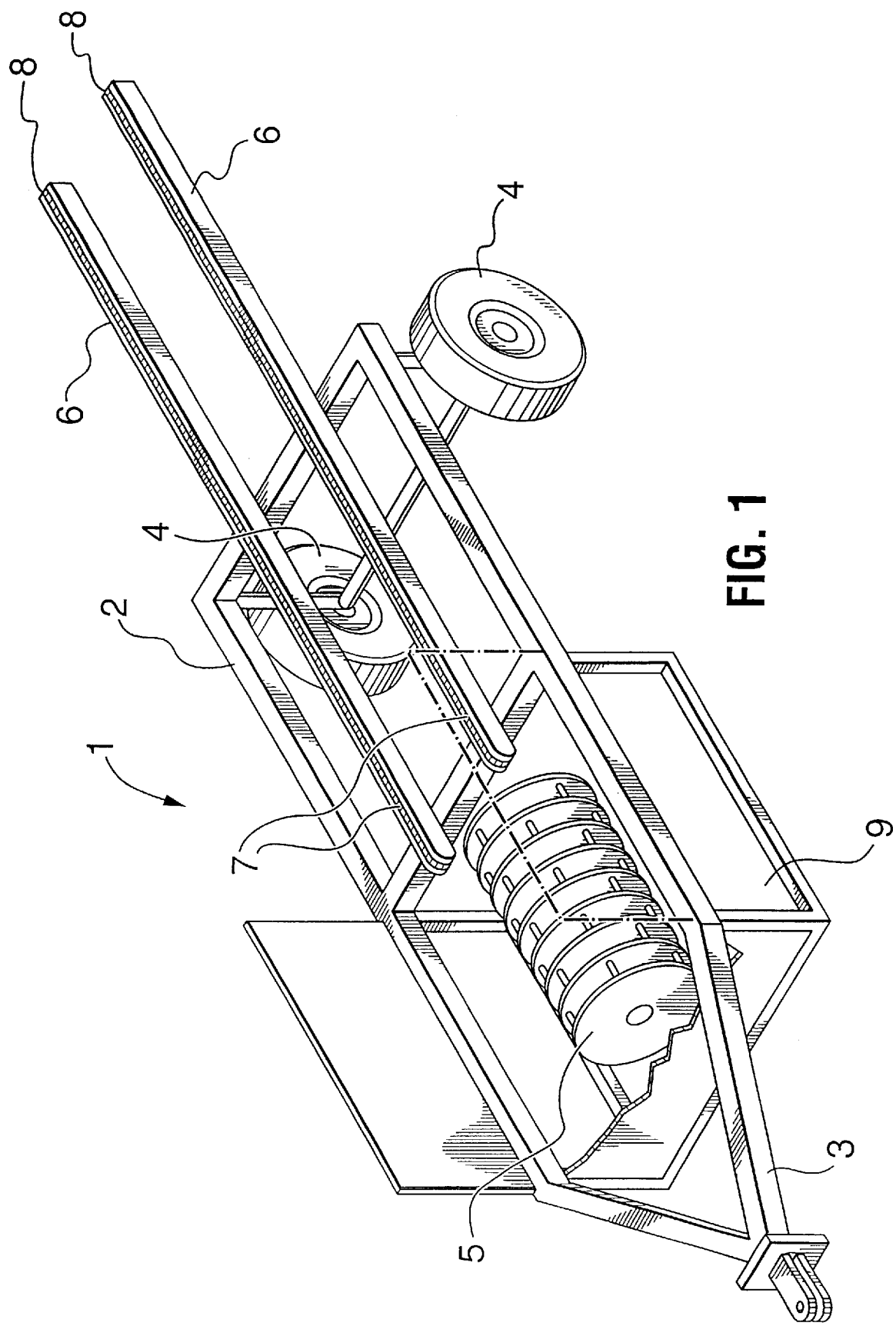
FIG. 1 is a schematic view of the processor in accordance with the present invention.

The bale processor 1 in accordance with the present invention as illustrated schematically in FIG. 1 generally comprises a frame 2 having a hitch section 3 for connection to a tractor or similar vehicle and a set of wheels 4 for moving the processor 1 about. One or more conveyor elements 6, such as chain conveyors or belt conveyors, are supported on the frame 2 in the direction of the length of the processor 1 such that the front ends 7 of the conveyors elements 6 are positioned towards the front of the processor 1 and the back ends 8 of the conveyor elements are extended past the back end of the frame 2. The processor 1 further includes a shredding roller 5 which is mounted inside the frame 2 at the front end of the processor 1 such that the axis of roller 5 near the conveyor elements 6 is below the front end 7 of the conveyor elements 6. In addition, the axis of roller 5 is generally in a vertical plane which is in the direction of the length of the processor 1 and which is perpendicular to the substantially horizontal plane through the conveyor elements 6.

In operation, the hitch section 3 is adapted to be connected to the tractor with the power for the processor 1 being provided by the power take-off and/or the hydraulics of the tractor. To load bales onto the processor 1, the back ends 8 of the conveyor elements 6 are lowered to the ground level; this may be achieved by having the frame 2 pivot about the wheel axle or by having the wheel axle pivot up towards the frame 2. The conveyors 6 are controlled such that the top surface of the conveyors 6 rotate from the back to the front of the processor 1 as the processor 1 is backed towards one or more bales that are laying on the ground. The back ends 8 of the conveyor elements 6 are forced under a bale and the bale is drawn onto the rotating surface of conveyors elements 6 towards the roller 5 at the front of the processor 1. When the conveyor elements 6 are loaded with bales, the back end 8 of the conveyor elements 6 may be raised off of the ground. To process the bales, the shredding roller 5 is made to rotate, and the bales are driven towards the shredding roller 5 by the conveyors 6. As the bale is shredded, it is discharged from the processor 1 through a discharge opening 9. In FIG. 1, the discharge opening 9 is shown to be on the left side of the processor land the shredding roller 5 would be rotating in a clockwise direction as seen from the back of the processor. However, it is within the scope of the present invention for the roller to be rotating in the counterclockwise direction and for the discharge opening to be on the right side of processor 1. The bale processor 1 may be used to process any type of bale such as large or small square bales as well a round bales.

The detailed structure of one embodiment of the present invention is illustrated in FIGS. 2, 3, 4 and 5 where the same components in the different figures have the same reference numbers.

The processor 10 in accordance with the present invention includes a frame 11 to which is attached the support structure 12 for the hitch 13 at the front end of the processor 10. Left and right side rails 14 and 15 which are flared at the back end of the processor 10 to facilitate entry of a bale onto the processor, are welded to uprights 16, 17, 18 and 19 which themselves are fixed to frame 11 by means of cross beams 20, 21. Side walls 22 and 23 are welded between the guard rails 14, 15 respectively and the frame 11 to enclose the front portion of the processor 10. A front end wall 24, an opposite partial transverse wall 25 and a shaped surface 26 at the bottom form an enclosure 29 to contain the shredding roller 28 which will be further described below. The enclosure 29 also has an opening 27 through which shredded crop material is discharged.

The processor 10 further includes a pair of wheels 30, 31 mounted on a axle 32. The axle 32 is welded to a pair of uprights 33, 34 which are pivotally connected to the frame 11 such that with the hitch 13 connected to the tractor, the wheels 30, 31 may be pivoted in order to vertically displace the back end of the processor 10.

Figure 4:
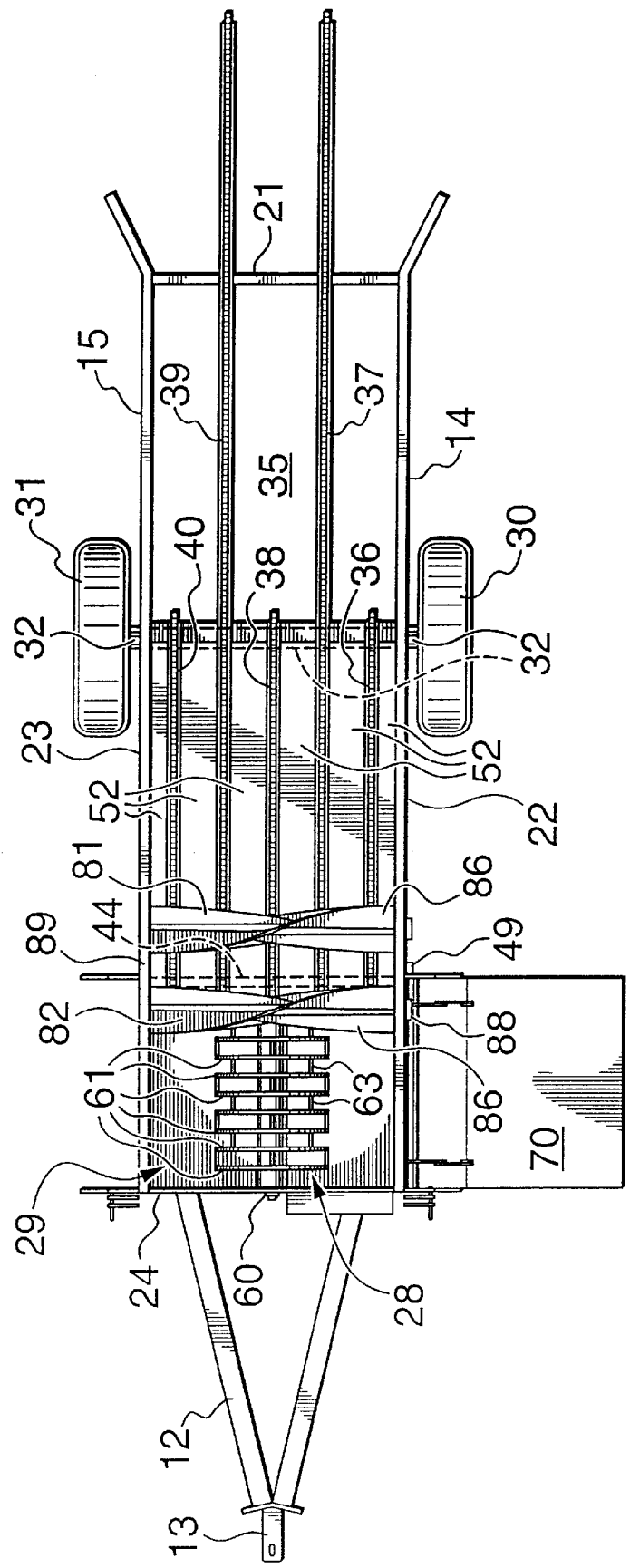
FIG. 4 is a top view of the embodiment in FIG. 2 with hood cut away.
Figure 6:
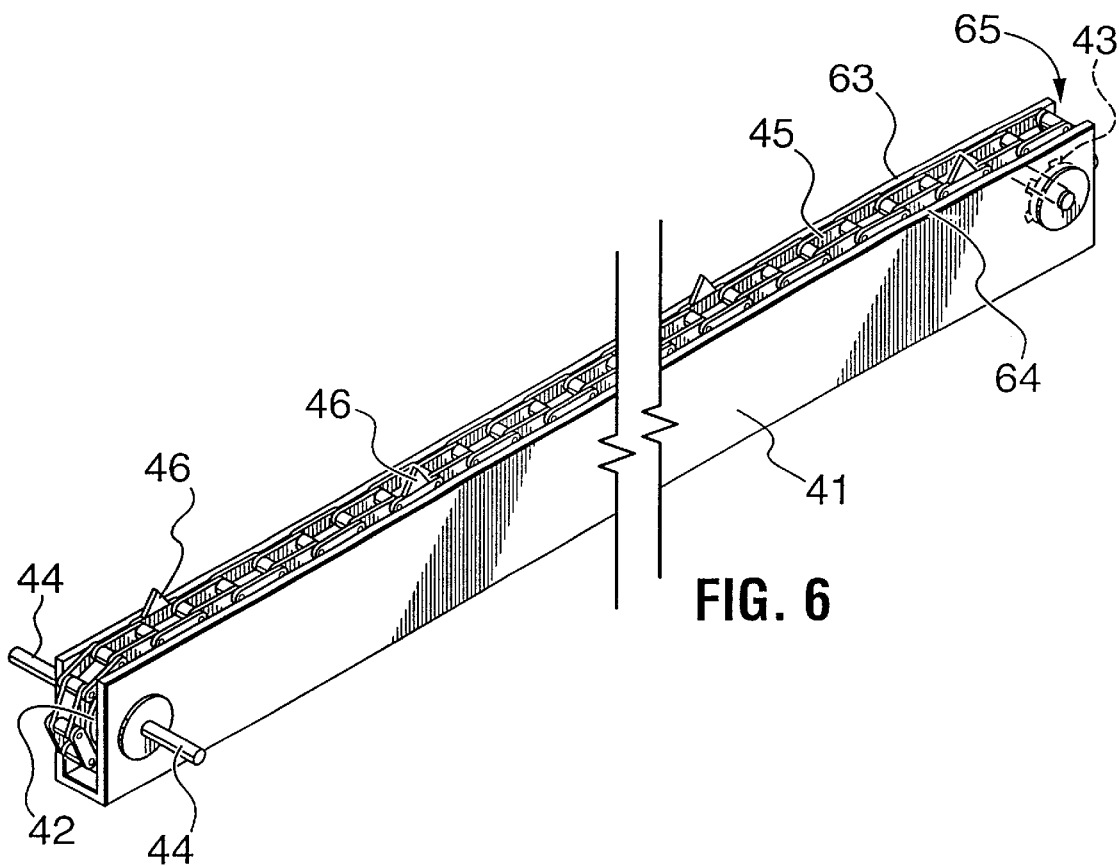
FIG. 6 is an isometric view of a chain conveyor.

The processor 10 also includes a conveyor 35 mounted along its length from the back end of the processor 10 to a location near the enclosure 29 over the transverse wall 25. The conveyor 35 may take many forms such as chain or belt conveyors. In this particular embodiment a design having five chain conveyors 36, 37, 38, 39 and 40 is illustrated. An example of a chain conveyor 36–40 is illustrated in FIG. 6. Each conveyor comprises a rectangular cross-section hollow rail 41 with two guides 63, 64 spatially fixed to the upper surface of the rail 41 to form a channel 65. Sprockets 42, 43 are mounted at each end of the rail 41. Sprocket 42 which is located at the front end of the rail 41 is mounted to rotate about an axle 44 which is connected to other corresponding conveyor sprockets 42, as illustrated in FIG. 4. Sprocket 43 is mounted at the back end of the rail 41 in order to be free wheeling. An endless conveyor chain 45 is positioned between the guides 63, 64 in the channel 65 of rail 41, is wrapped around sprockets 42,43 and returns through the interior of hollow rail 41. Conveyor chain teeth 46 for gripping the bales are mounted on the chain at appropriate intervals.

As illustrated in FIG. 4, this preferred embodiment includes 5 chain conveyors 36–40. Conveyors 37 and 39 are made sufficiently long so that the end of the conveyors 37 and 39 will be at ground level when the back end of the processor 10 is lowered. This enables the processor to be backed-up to a bale and have the bale driven forward onto the conveyors 37 and 39. In addition, conveyors may be made sufficiently long to be able to carry more than one large bale. Conveyors 36, 38 and 40 are somewhat shorter than conveyors 37 and 39. The length of conveyors 36, 38 and 40 are in the order of the length of a large square bale, however they may be shorter or longer if desired. Conveyors 36,38 and 40 assist conveyors 37 and 39 to move the bale towards shredding roller 28 enclosure 29.

Figure 2:
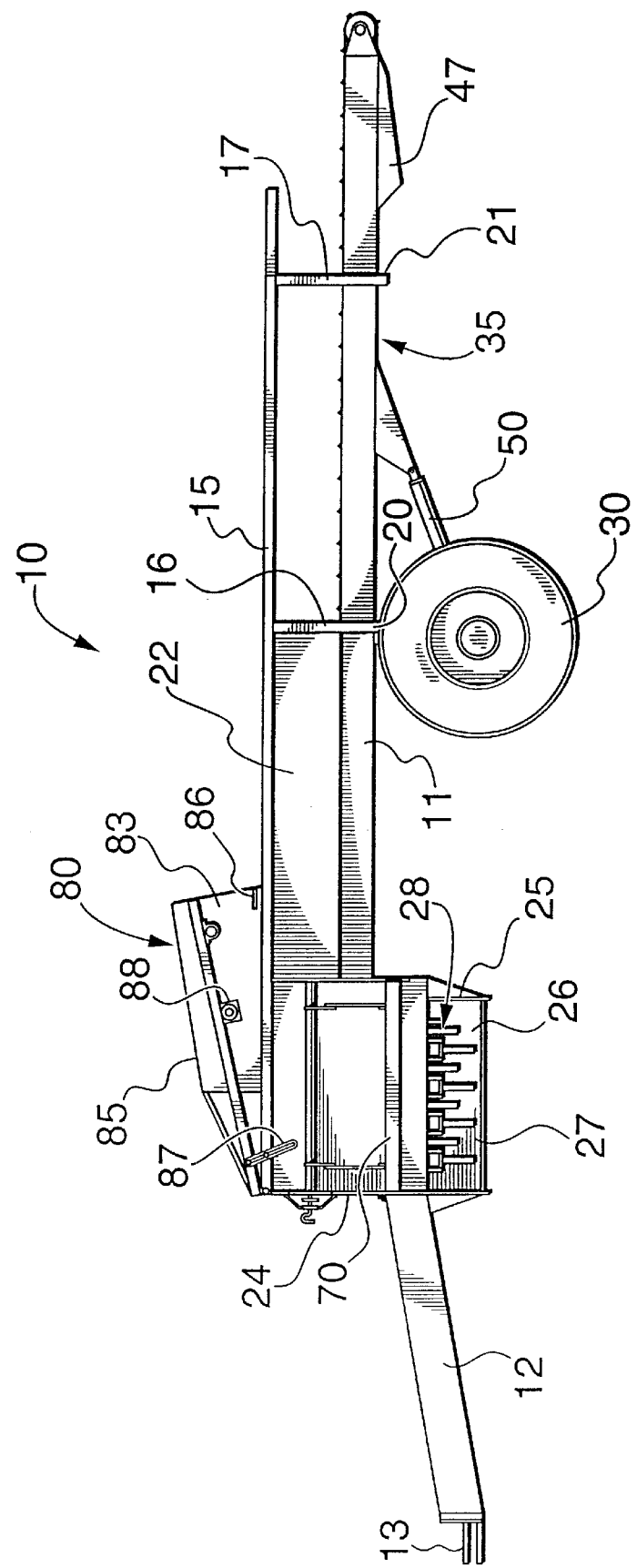
FIG. 2 is a side view of one embodiment of the present invention.
Figure 3:
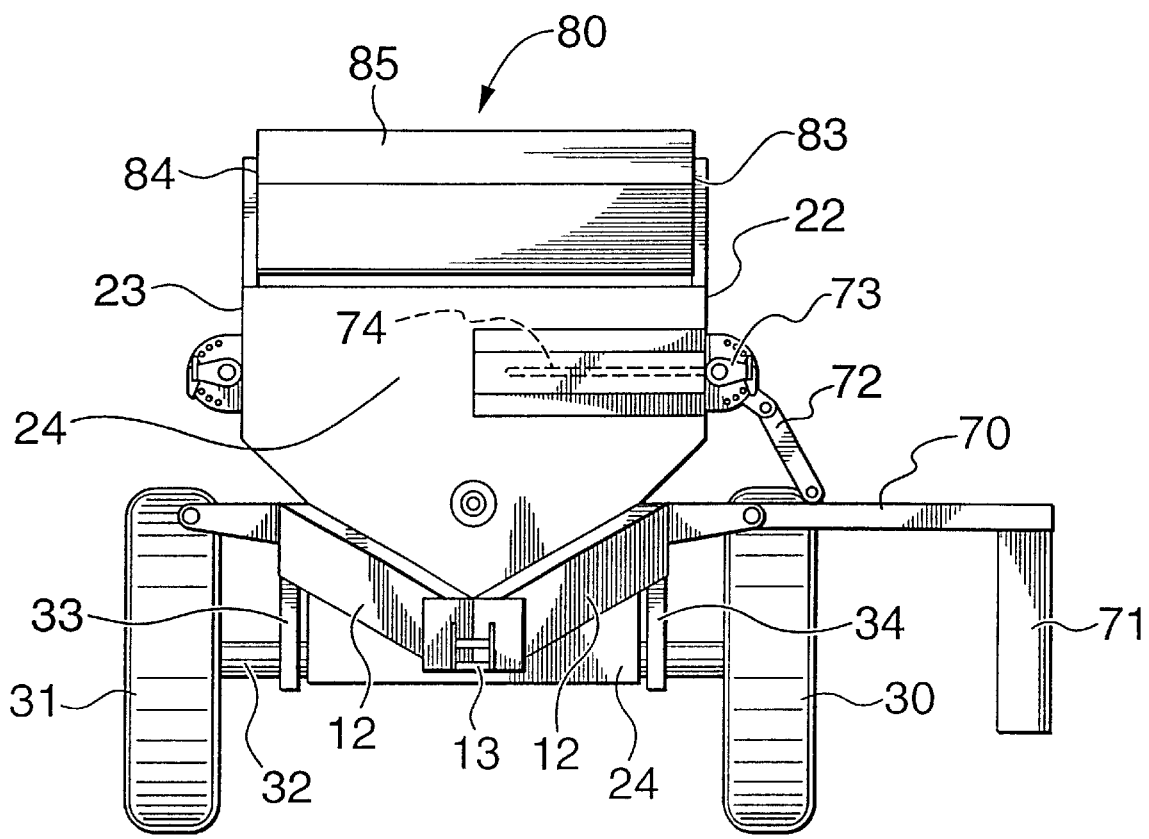
FIG. 3 is a front view of the embodiment in FIG. 2.
Figure 5:
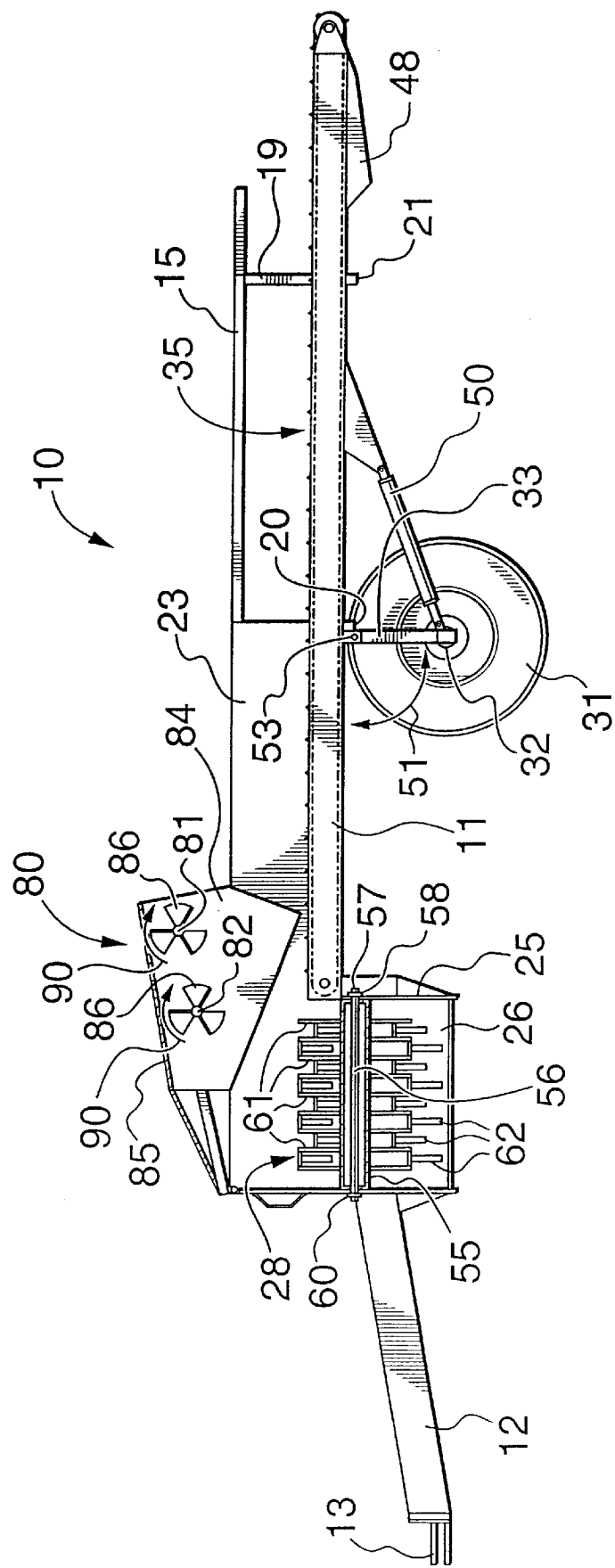
FIG. 5 is a cross sectional view of the embodiment in FIG. 2.

In addition, as illustrated in FIGS. 2 and 5, skids 47, 48 are mounted on the underside of the conveyor rails 37 and 39 respectively. These skids 47, 48 allow the conveyors 37 and 39 to drag on the ground when approaching a bale without damage to the chain 45 or teeth 46.

A reversible hydraulic motor 49 is coupled to axle 44 which connects all of the conveyors 36–40 together such that they will all rotate in the same direction. In this particular embodiment, all sprockets 42 are of the same size such that the conveyors 36–40 move at the same speed, however, this need not be the case.

In order to control the height of the back-end of the processor 10, one or more hydraulic cylinders 50 are connected between the wheel axle 32 and the conveyor rails 37,39. In this particular embodiment, two hydraulic cylinders 50 are controlled from the tractor to pivot the wheels 30, 31 forward relative to the processor 10 as shown by arrow 51. The processor 10 pivots at the hitch 13 which is connected to the tractor to allow the back-end of the processor 10, namely the conveyors 37 and 39 to be lowered to the ground level. After the conveyors 37 and 39 load one or more bales on the processor, the wheels 30 and 31 are pivoted back such that the conveyors 37 and 39 become substantially horizontal again. However, the processor 10 may be operated to carry and process bales with the back-end of the processor 10 below or above the horizontal position.

To facilitate the movement of the baled crop material towards the shredding roller 28, plates 52 may be installed between the conveyors 36–40 and between the conveyors 36 and 40 and their respective sidewalks 22 and 23. This prevents the bales from getting caught up in the conveyor rails 41 and prevents loose crop material from falling through the processor 10 between the conveyors 36–40 particularly after the baling twine which holds the bales together has been cut.

Figure 7:
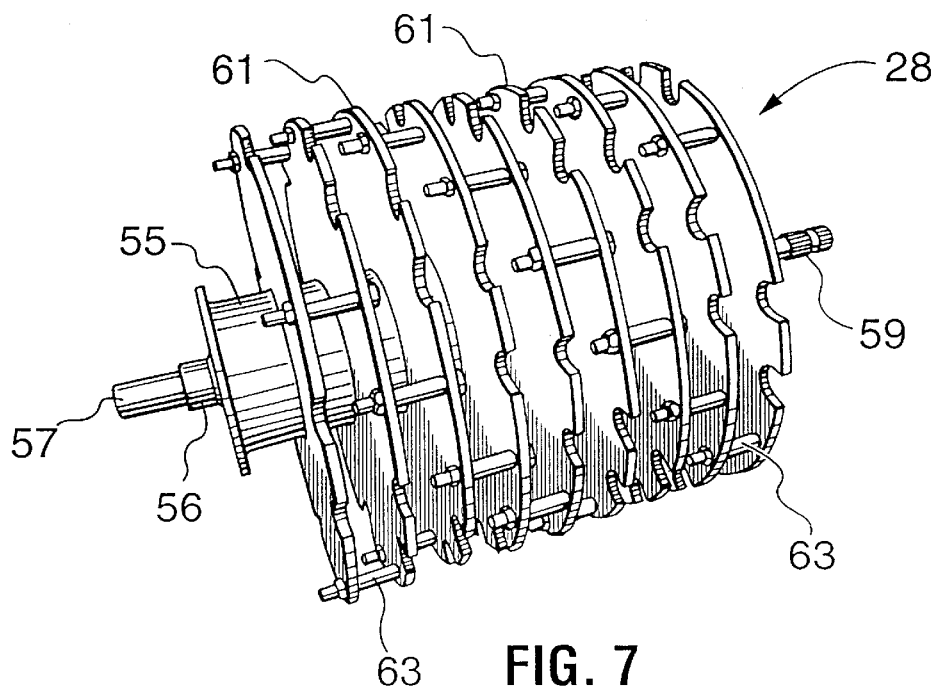
FIG. 7 is an isometric view of a shredding roller used in the embodiment in FIG. 2.

The shredding roller 28 as shown in FIG. 7 comprises a hollow hub 55 fixed to an axle 56 which has a first end 57 adapted to fit into a bearing 58 located in the transverse wall 23. The other end 59 of the axle 56 is adapted to pass through a bearing 60 located in the front wall 24 to be connected to the tractor power take-off for rotation. The axle 56 may be positioned substantially horizontal, however, it may also be made to slope upwards towards the front wall 24 from the transverse wall 25 to provide greater flair roller surface area to the bale as it progresses towards the front of processor 1. The roller 28 further includes a number of circular plates 61 fixed to the hub 55 in a spaced relationship. The plates 61 are adapted to have shredding flails 62 (FIGS. 2 and 5) mounted between the plates 61 on bolts 63 so as to move freely to extend away from the plates 61 as the roller 28 is rotated rapidly. The flails 62 are equally spaced around the periphery of the plates 61, in this case four flails 90° apart, and adjacent rows of flails are offset, in this case at 30°. This allows for maximum shredding efficiency while maintaining a balanced shredding roller 28.

In this particular embodiment, the roller 28 is made to rotate in the clockwise direction as seen from the back of the processor 10. Thus the shredded baled crop material will be discharged to the left of the processor 10 through the opening 27. In order to control the discharge of the material, a discharge door 70 is mounted above the opening 27. The outer edge of the discharge door 70 further includes a pliable skirt 71. The discharge door 70 may be raised and lowered by a levered mechanism 72 which is biased with a spring 74 to facilitate its movement by an operator. Once positioned, it may be locked in place using a locking mechanism 73.

In order to facilitate feeding the bales onto the shredding roller 28 as it is being moved forward by the conveyors 36–40, one or more feed rollers 81, 82 are located in a hood 80. Feed rollers 81, 82 may have protrusions such as auger fins 86 or rigid beater bars to grip the bales more efficiently. Hood 80 includes a pair of triangular shaped side walls 83, 84 which are held rigidly apart by transverse braces or a rectangular shaped cover 85. The hood 80 is made to fit within the front end of the processor 10 above the shredding roller 28. The front end of the hood 80 is pivotally mounted to the front end of the processor such that the back end of the hood may move up and down between the side walls 22, 23. Stopper plates 86 are fixed to the both sides of the hood 80 to prevent it from falling onto the conveyors 36–40; a further stopper mechanism 87 prevents the hood from lifting above a certain point over the shredding roller 28.

The feed rollers 81 and 82 are positioned transversely between the side walls 83, 84 and held in place in bearings mounted on the walls 83, 84. The feed rollers 81, 82 may be powered by individual reversible hydraulic motors 88; however one hydraulic motor 88 may be used to drive one of the feed rollers 81, 82, feed roller 82 in FIG. 2, which is then connected in tandem with the second feed roller 81 using a chain drive 89. The feed rollers 81, 82 would therefore rotate in the same direction, generally in the clockwise direction as exemplified by arrows 90 in FIG. 5.

To operate the bale processor 10 in accordance with the present invention, the operator would hitch the processor 10 to a tractor or other power source. The tractor power takeoff is connected to the shredding roller 28 while the tractor hydraulics is connected to the feeder motor 88, the conveyor motor 49 and the hydraulic cylinders 50. The processor 10 is backed up to a row of bales. The operator controls the hydraulic cylinders 50 to pivot the wheels 30, 31 towards the front thus lowering the back of the conveyors 37, 39 to the ground such that they rest on skids 47, 48. Hydraulic motor 49 is started to cause the conveyors 36–40 to move from the back of the processor 10 towards the front; at the same time the processor 10 may be backed up further to assist the bale to mount onto the conveyors 37, 39. Once one or more bales are loaded onto the processor 10, the conveyor motor 49 is stopped and the hydraulic cylinders 50 are operated to raise the back end of the processor 10 to substantially a horizontal position. The processor 10 is then moved to the area where shredded crop material is desired. To process the bales, the discharge door is raised to the desired level for spreading the material as a bed or lowered to discharge the material into a feed bunk or as a windrow. The power take-off is engaged to rotate the shredding roller 28 and hydraulic motor 88 is started to rotate the feed rollers 81, 82. Conveyor motor 49 is again started to drive the bales towards the shredding roller 28 while the feed rollers 81, 82 are driven up onto the bale to help drive it onto the shredding roller 28. This process continues until the bales have been processed. It is to be noted that at any time, if required, the conveyors 36–40, feed rollers 81, 82 or both may be reversed in direction to move the bale away from the shredding roller 28 to avoid plugging or for other purposes.

The preferred embodiment of the present invention is illustrated in FIGS. 8, 9, 10 and 11 where the same components in the different figures have the same reference numbers and only the differences between the preferred embodiment and the previous embodiment will be described.

The processor 100 in accordance with the preferred embodiment includes a frame 101 to which is attached the support structure 102 for the hitch 103 at the front end of the processor 100. Left and right side rails 104 and 105 are flared at the back end of the processor 100 to facilitate entry of a bale onto the processor. Side walls 106 and 107 are welded to the guard rails 104, 105 respectively and the frame 101 to enclose the front portion of the processor 100. A front end wall 108, an opposite partial transverse wall 109 and a shaped bottom surface 110 at the bottom form an enclosure 114 to contain the shredding roller 115 which will be further described below. The shaped surface 110 includes two flat surface 111 and 112 that slope downward from the side walls 106 and 107 respectively, and a curved conically shaped partial bottom 113 welded at its edge to surface 112 as well as end walls 108 and 109. The space between the flat surface 111 and the partial bottom 113 forms an opening 116 in enclosure 114 to the left of the processor 100 through which shredded crop material is discharged.

The processor 100 further includes a pair of wheels 117, 118 mounted on a axle 119. The axle 119 is pivotally connected to the frame 101 in the same manner as in FIG. 2 such that with the hitch 103 connected to the tractor, the wheels 117, 118 may be pivoted in order to vertically displace the back end of the processor 100.

The processor 100 further includes a conveyor 120 mounted along its length from the back end of the processor 100 to a location near the enclosure 114 over the transverse wall 109. The conveyor 120 may take many forms such as chain or belt conveyors. In this particular embodiment four chain conveyors 121, 122, 123 and 124 are shown. An example of a chain conveyor has been described with respect to FIG. 6.

Figure 8:
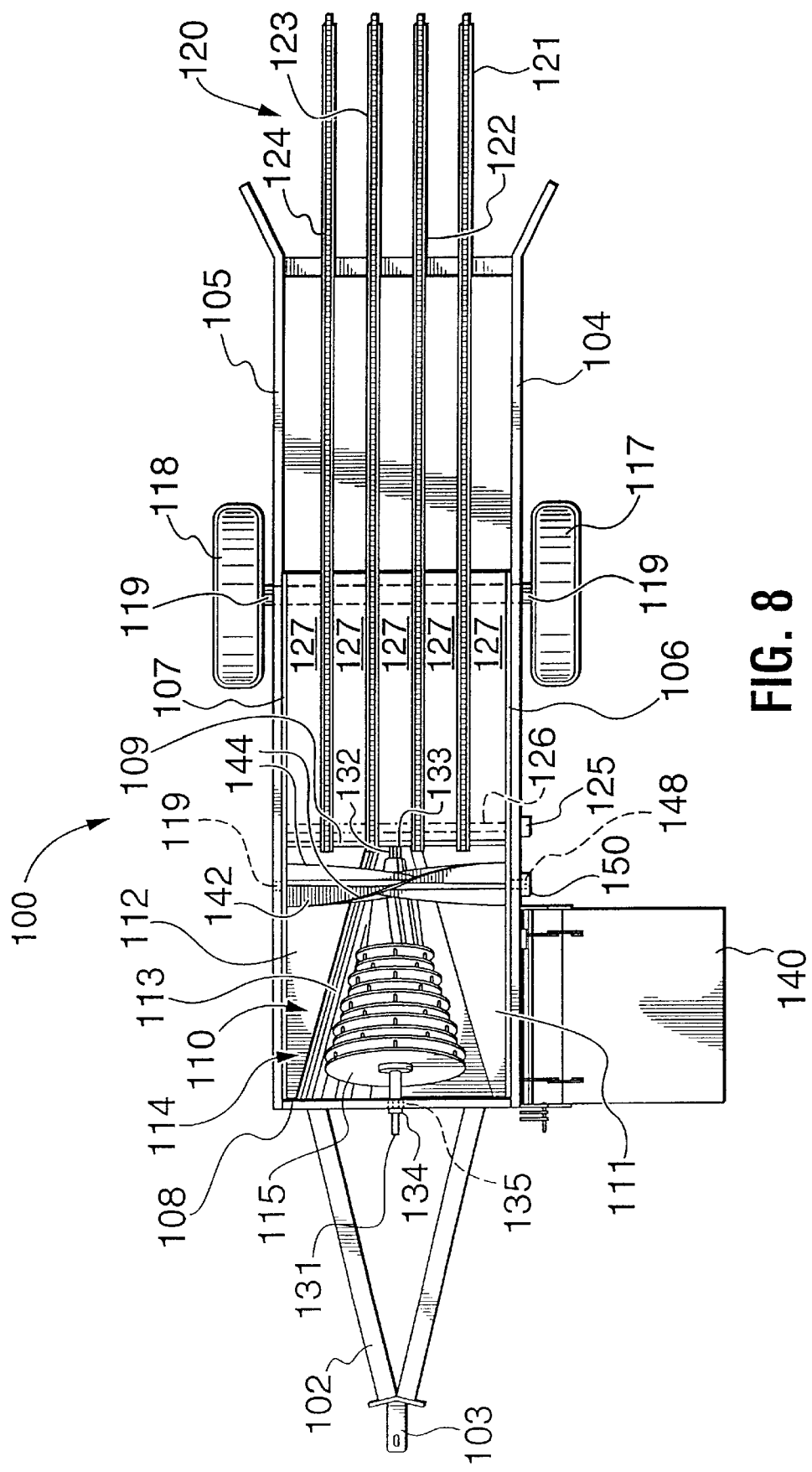
FIG. 8 is a top view of the preferred embodiment in accordance with the present invention with the hood cut away.
Figure 9:
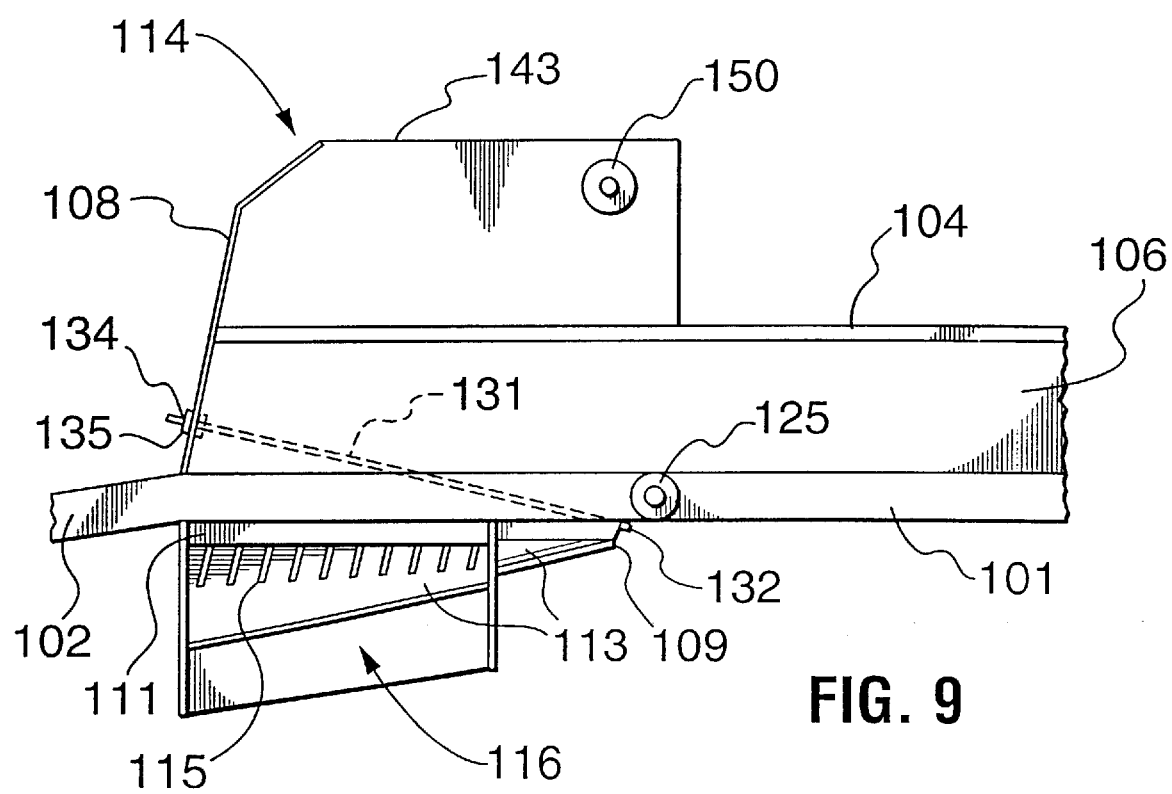
FIG. 9 is a side view of the front end of the processor in FIG. 8.
Figure 10:
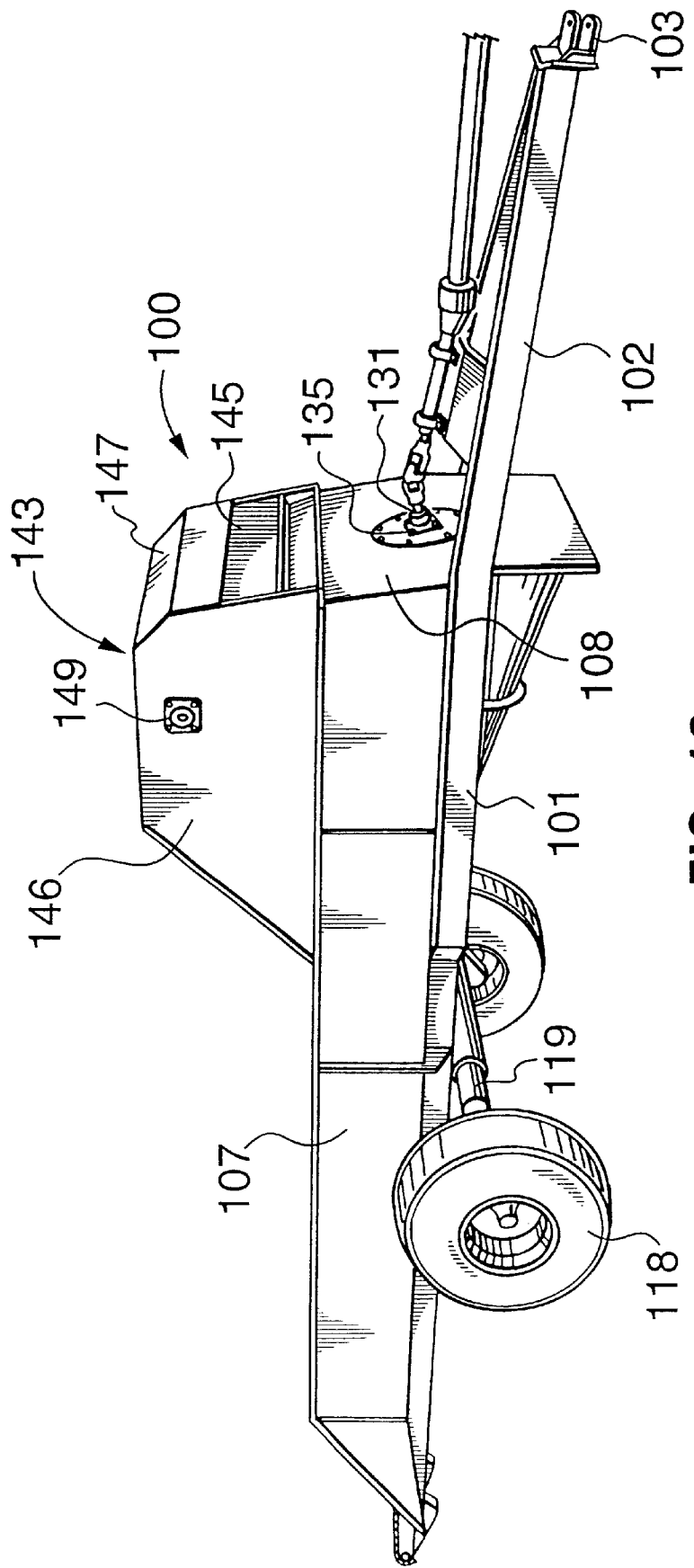
FIG. 10 is an isometric view of the front end of the processor in FIG. 8.

As illustrated in FIG. 8, this preferred embodiment includes 4 chain conveyors 121–124 of substantially equal length so that all of the conveyors can participate in the initial loading of a bale onto the processor 100 even if the bale is to one side of the processor 100 and in driving the bale onto the shredding roller 115. Conveyors 121–124 are made sufficiently long so that the end of the conveyors 121–124 may be lowered down to ground level when the back end of the processor 100 is pivoted downwards.

A reversible hydraulic motor 125 is coupled to an axle 126 which is fixed to the front end sprocket of each of the conveyors 121–124 such that the conveyors will all rotate in the same direction preferably at the same speed, however, this need not be the case.

To facilitate the movement of the baled crop material towards the shredding roller 15, plates 127 may be installed between the conveyors 121–124 and between the conveyors 121 and 124 and their respective sidewalks 106 and 107. This prevents loose crop material from falling through the processor 100 between the conveyors 121–124 particularly after the baling twine which holds the bales together has been cut.

Figure 11:
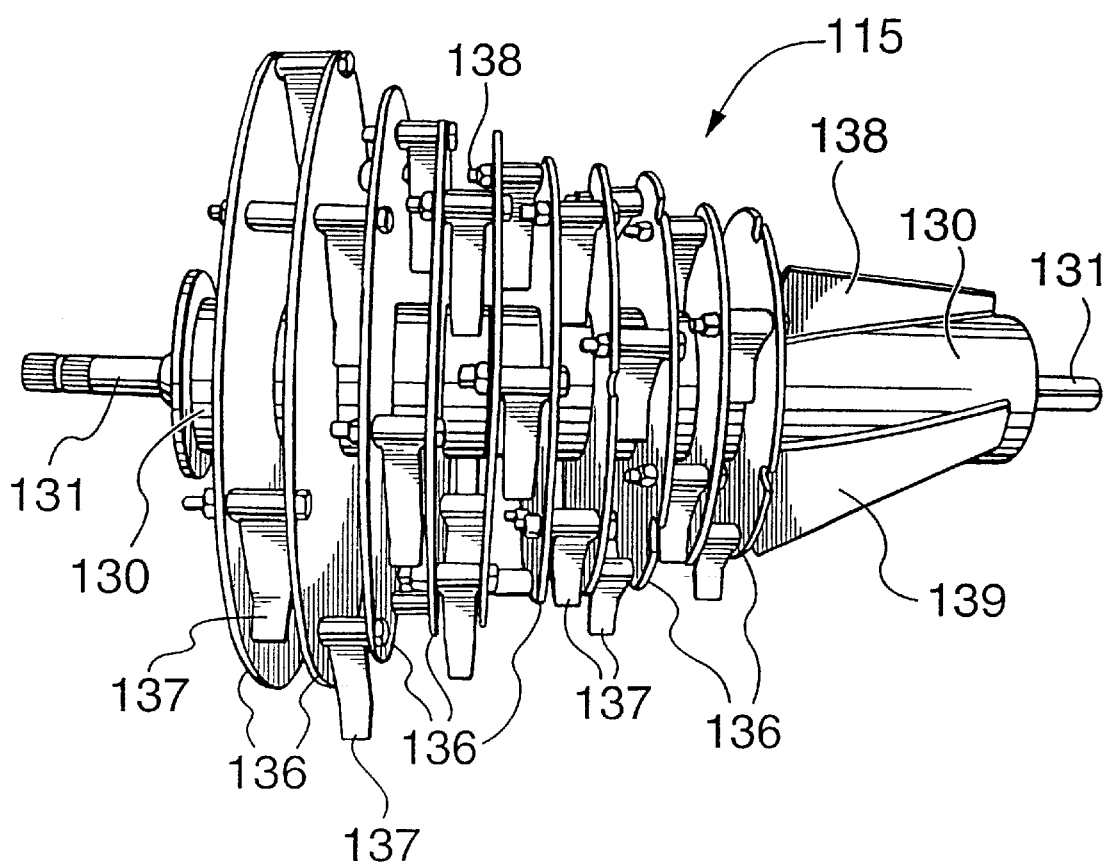
FIG. 11 is a side view of the shredding roller in accordance with the preferred embodiment of this invention.

The shredding roller 115 as shown in FIG. 11 comprises a hollow hub 130 fixed to an axle 131. The roller 115 further includes a number of circular plates 136 fixed to the hub 130 in a spaced relationship. In this particular embodiment, the diameters of the circular plates 136 are smaller as one goes from the front end to the back end of the roller 115 to produce a truncated cone shaped roller 115. The smallest plate may be in the order of 65% of the diameter of the largest plate. In addition, curvilinear fins are fixed to the hub 130 between the smallest plate 136 and the back end of the hub 130 to initiate the shredding process of the bale as it is driven over the roller 115 by the conveyors 121–124. As in the embodiment illustrated in FIG. 7, shredding flails 137 are mounted between plates 136 on bolts 138 such that each may freely rotate 360° about the bolt 138 and extend away from the plates 136 as the roller 115 is rotated rapidly. In order to rotate freely, the flails 137 between the smaller diameter plates 136 are shorter than the flails 137 between the larger diameter plates 136; they may be in the order of 50% shorter. The flails 137 are equally spaced around the periphery of the plates 136 and adjacent rows of flails 137 are offset such that the roller 115 is maintained in rotational balance.

The axle 131 at the back end 132 of the roller 115 is adapted to fit into a bearing 133 located in the transverse wall 109. The axle 131 at the front end 134 of the roller 115 is adapted to pass through a bearing 135 located in the front wall 108 to be connected to the tractor power take-off for rotation. When positioned within the processor 100, the axle 131 is sloped upwards towards the front wall 108 from the transverse wall 109 to provide greater flair roller surface area to the bale as the bale progresses towards the front of processor 100. This provides for maximum shredding efficiency, however, since the roller 115 is conically shaped, the axle may be substantially horizontal and still provide for effective shredding.

In this particular embodiment, the roller 115 is made to rotate in the clockwise direction as seen from the back of the processor 100; thus the shredded baled crop material will be discharged to the left of the processor 100 through the opening 116. However, as with the embodiment in FIG. 2, the shredding roller 115 may be rotated in counter-clockwise direction for discharge on the right of the processor 100. In order to control the discharge of the material, a discharge door 140 is mounted above the opening 116. The discharge door 140 may be raised and lowered to discharge the bale material into a bed, windrow or feed bunk.

In order to facilitate feeding the bales onto the shredding roller 115 as it is being moved forward by the conveyors 121–124, one or more feed rollers 142 is located in a hood 143 at the front end of the processor 100. Feed roller 142 may have protrusions such as auger fins 144 or rigid beater bars to grip the bales more efficiently as it rotates. Hood 143 includes a pair of side walls 145, 146 which are held rigidly apart by transverse braces or a cover 147 which may partially cover the top and the front of the hood 143. The hood 143 is fixed such as by welding to the front wall 108 and the side walls 104 and 105 of the processor 100.

The feed roller 142 is positioned transversely between the side walls 145, 146 and held in place by bearings 148, 149 mounted on the walls 145, 146. The feed roller 142 may be powered by a reversible hydraulic motor 150. The feed roller 142 is controlled to rotate in the opposite direction to that of conveyor motor 125 such that both the conveyors 121–124 and feed roller 142 operate together to move the bale in one direction or the other.

The operation of the bale processor 100 is very similar to the operation of the bale processor 10 as described above. The operator hitches the processor 100 to a tractor or other power source . The tractor power takeoff is connected to the shredding roller 115 while the tractor hydraulics is connected to the feed motor 150, the conveyor motor 125 and the hydraulic cylinders to lower and raise the back end of the processor 100. The processor 100 is backed up to a one or more bales. The operator pivots the wheels 117, 118 towards the front thus lowering the back of the conveyors 121–124 to the ground. Hydraulic motor 125 is started to cause the top surface of the conveyors 121–124 to move from the back of the processor 100 towards the front; at the same time the processor 100 may continue to backup to assist the bale to mount onto the conveyors 121–124. Once one or more bales are loaded onto the processor 100 the conveyor motor 125 is stopped and the processor 100 is raised to its substantially horizontal position. The processor 100 is then moved to the area where shredded crop material is desired. To process the bales, the discharge door 140 is raised to the desired level for spreading the material into a bed or lowered to discharge t he material into a wind row or feed bunk. The power take-off is engaged to rotate the shredding roller 115 and hydraulic motor 150 is started to rotate the feed roller 142. Conveyor motor 125 is again started to drive the bales towards the shredding roller 115 while the feed roller 142 helps drive the bale onto the shredding roller 115. This process continues until the bales have been processed. It is to be noted that at any time, if required, the conveyors 121–124, feed roller 142 or both may be reversed in direction to move the bale away from the shredding rollers 115 to avoid plugging or for other purposes.

The tapered roller 115 a arrangement with the feed roller 142 is particularly advantageous with large square bales since the small end of the roller 115 commences the process of shredding the end of the bale over a small area which gets progressively larger as the bale is driven onto the shredding roller 115 to provide consistent processing. In addition, since large square bales are packed in layers or slabs along their length, these slabs tend to separate after the cord binding the bale together is severed. The feed roller 142 grips the top of the slabs and drives them onto the shredding roller 115.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A bale processor comprising:
   frame means having front and back ends and two sides conveyor means mounted on the frame means and having front and back ends;
   means for mounting the frame means to wheel means and for moving the back end of the conveyor means between a position a predetermined distance above the ground and a position adjacent the ground;
   bale shredding roller having a front end and a back end, the roller being rotatably mounted adjacent the front end of the conveyor means with its axis of rotation lying in a generally vertical plane which is substantially perpendicular to the conveyor means in the direction of the length of the processor and the roller axis at the back end of the roller positioned below the conveyor means; and
   means for operating the conveyor means for moving one or more bales on the surface of the conveyor means along its length.

2. A bale processor as claimed in claim 1 wherein the conveyor means comprises two or more chain conveyors mounted substantially parallel to one another.

3. A bale processor as claimed in claim 2 wherein the chain conveyors are substantially equal in length.

4. A bale processor as claimed in claim 2 wherein at least two of the chain conveyors are longer than the remaining chain conveyors.

5. A bale processor as claimed in claim 1 and further comprising one or more feed rollers mounted transversely to the frame means above the shredding roller for driving the bale onto the shredding roller.

6. A bale processor as claimed in claim 5 wherein the feed roller has a length substantially equal to the width of the frame means.

7. A bale processor as claimed in claim 5 wherein the feed roller includes auger fins for gripping the bale.

8. A bale processor as claimed in claim 5 wherein the feed roller includes beater bars for gripping the bale.

9. A bale processor as claimed in claim 1 wherein the bale shredding roller is substantially cylindrical with flails symmetrically spaced about its circumference and along its length.

10. A bale processor as claimed in claim 9 wherein the bale shredding roller axis is substantially horizontal.

11. A bale processor as claimed in claim 9 wherein the bale shredding roller axis slopes upward from the back end of the shredding roller to the front end of the roller.

12. A bale processor as claimed in claim 1 wherein the bale shredding roller is generally shaped as a truncated cone with the diameter at the back end of the shredding roller being smaller than the diameter at the front end and with flails symmetrically spaced about its circumference and along its length.

13. A bale processor as claimed in claim 12 wherein the bale shredding roller axis is substantially horizontal.

14. A bale processor as claimed in claim 12 wherein the bale shredding roller axis slopes upward from the back end of the shredding roller to the front end of the roller.

15. A bale processor as claimed in claim 1 wherein the bale shredding roller comprises:
    an axle;
    a plurality of circular plates spaced along the axle; and
    a number of flails rotatably mounted symmetrically between the plates along the length of the axle.

16. A bale processor as claimed in claim 15 wherein the circular plates are substantially equal in diameter.

17. A bale processor as claimed in claim 15 wherein the diameter of adjacent circular plates are sequentially smaller from the front end towards the back end of the shredding roller.

18. A bale processor as claimed in claim 17 wherein the bale shredding roller further includes an elongated cylindrical hub fixed between the axle and the circular plates.

19. A bale processor as claimed in claim 18 wherein the bale shredding roller further comprises a number of curvilinear fins fixed to the hub between the smallest circular plate and the back end of the shredding roller.

20. A bale processor as claimed in claim 1 wherein the means for mounting the frame means on the wheel means comprises at least two support members spatially positioned between the frame means and the wheel means with one end of each support member being fixed to the wheel means and the other end of each support member being pivotally attached to the frame means whereby the wheel means may be pivoted about the frame means attachment for lowering and raising the back end of the conveyor means.

21. A bale processor as claimed in claim 15 which further includes hydraulic means connected between the wheel means and the frame means for controlling the pivoting of the wheel means.

* * * * *